United States Patent

Neumann

[15] 3,662,622
[45] May 16, 1972

[54] DRIVE UNITS FOR AUTOMATIC WASHING MACHINES

[72] Inventor: Gernot Neumann, Lipperreiche, near Bielefeld, Germany

[73] Assignee: Hanning Elektro-Werke Robert Hanning, Bielefeld, Germany

[22] Filed: Aug. 31, 1970

[21] Appl. No.: 68,063

[30] Foreign Application Priority Data

Sept. 4, 1969   Germany ...................... P 19 44 771.3

[52] U.S. Cl. .............................................. 74/752 E, 192/22
[51] Int. Cl. ...................................... F16h 5/42, F16d 11/04
[58] Field of Search ................. 74/752 B, 752 E; 192/22, 4, 192/3, 48.92, 35, 48.7, 51

[56] References Cited

UNITED STATES PATENTS

| | | | |
|---|---|---|---|
| 2,305,822 | 12/1942 | Wittner | 74/752 E UX |
| 2,597,854 | 5/1952 | Cross et al. | 74/752 E |
| 2,649,817 | 8/1953 | La Voque | 74/752 E X |
| 2,924,997 | 2/1960 | Rodler, Jr. | 74/752 E |
| 3,108,494 | 10/1963 | Kell | 74/752 B |

Primary Examiner—Arthur T. McKeon
Attorney—McGlew and Toren

[57] ABSTRACT

A drive unit for a drum-type automatic washing machine requiring a low speed of rotation for washing and rinsing and higher speeds for spin-drying, the drive unit comprising a drive motor in the form of a pole-changeable electric motor producing at least two speeds of rotation, a motor shaft, a hollow shaft mounted on the motor shaft, a reduction gear arranged to transmit drive from the motor shaft to the hollow shaft, a friction clutch mounted on the hollow shaft and engageable with a clutch casing, a centrifugal clutch mounted on the motor shaft and a drive member secured to the clutch casing, the friction clutch being operative at low speeds and the centrifugal clutch at high speeds of the drive motor to cause rotation of the drive member and the friction clutch comprising a flexible clutch ring having a recess in the form of a heart cam, pressure roller located in the recess and mounted on lateral flanges, the pressure roller being effective to force the clutch ring to engage the clutch casing after a single revolution of the lateral flanges.

3 Claims, 6 Drawing Figures

3,662,622

DRIVE UNITS FOR AUTOMATIC WASHING MACHINES

BACKGROUND OF THE INVENTION

Drive units are known, which are used particularly in drum-type automatic washing machines which require a low speed for the washing and rinsing and higher speeds for the spin drying. A pole changeable motor producing at least two speeds is used as a drive motor and comprises a reduction gear which is mounted coaxially and which supplies the low washing speed to the drive member through a hollow shaft surrounding the motor shaft and a double-acting friction clutch mounted on this hollow shaft. The higher spin-drying speed, on the other hand, is transmitted by means of s centrifugal clutch which is secured to the motor shaft, is automatically connected to the drive member only in the case of the higher motor speed, as a result of its design, and puts the friction clutch out of action.

The friction clutches used in drive units of the above-mentioned type with rigid or rigidly mounted coupling means, have often led to difficulties, in that a fracture of the clutch members occurred in the event of faulty operation, and furthermore loud noises and shock loading were inevitable during engagement. In addition, the engagement always took place after the clutch has turned through a small angle so that the drive motor had to apply a correspondingly high starting torque.

SUMMARY OF THE INVENTION

The object of the present invention is to overcome the above-mentioned disadvantages and to prevent faulty engagement leading to locking of the drive unit which could occur hitherto if the clutch members were entrained by the clutch housing during spin-drying operation. Such entrainment could not be entirely eliminated because the clutch housing may be subject to occasional oscillatory motions at the high spin-drying speeds.

In order to solve the problems posed, the invention starts from the construction described above of a drive unit, and, in order to improve its characteristics, proposes that the friction clutch serving to transmit the washing speed should have a flexible clutch ring which receives, in its interior, pressure rollers which are mounted in a recess in the form of a heart-shaped cam and which are mounted on lateral flanges rigidly connected to the hollow shaft, and press the clutch ring, which is held back by a fixed-point lever braked between friction discs on the gear casing against the clutch housing secured to the drive member, by deformation, after a single revolution of the flange.

According to a further object of the invention, the clutch ring is preferably made of an elastic material.

According to a still further object of the invention, in order to avoid faulty engagement during the spin-drying operation the friction clutch is desirably equipped with a resilient pawl which is articulated on the flange and to that extent for axial movement on the hollow shaft, and which, in the direction of rotation occurring during the spin-drying, bears against a stop so as to prevent the clutch ring carrying a pin from being turned beyond its zero position, and the fixed-point lever is desirably provided with a projection which engages above or below the pawl depending on the direction of rotation of the friction clutch and which lifts the pawl above the stop to release the clutch ring in the washing direction of rotation which is opposite to the spin-drying direction, and pulls it back, over the stop constructed unilaterally in the form of an inclined plane for this purpose, into the position locking the clutch ring in the spin-drying direction of rotation, in the washing direction corresponding to the spin-drying direction.

The technical progress achieved by the subject of the invention is expressed in the advantages which this has in comparison with conventional drive units. Thus shock loading is avoided on engagement because of the flexibly constructed clutch ring, as a result of which the associated loud noises are also eliminated. Likewise, because of the locking of the clutch ring in the spin-drying direction of rotation, unwanted faulty engagement can no longer occur which previously led to locking of the drive unit and frequently to its failure. Finally, it is a considerable advantage for the dimensioning of the drive motor that this only has to deliver full power after a single revolution of the friction clutch.

BRIEF DESCRIPTION OF THE DRAWINGS

The invention will now be further described, by way of example, with reference to the accompanying drawings in which.

DESCRIPTION OF PREFERRED EMBODIMENT

Figure 1:
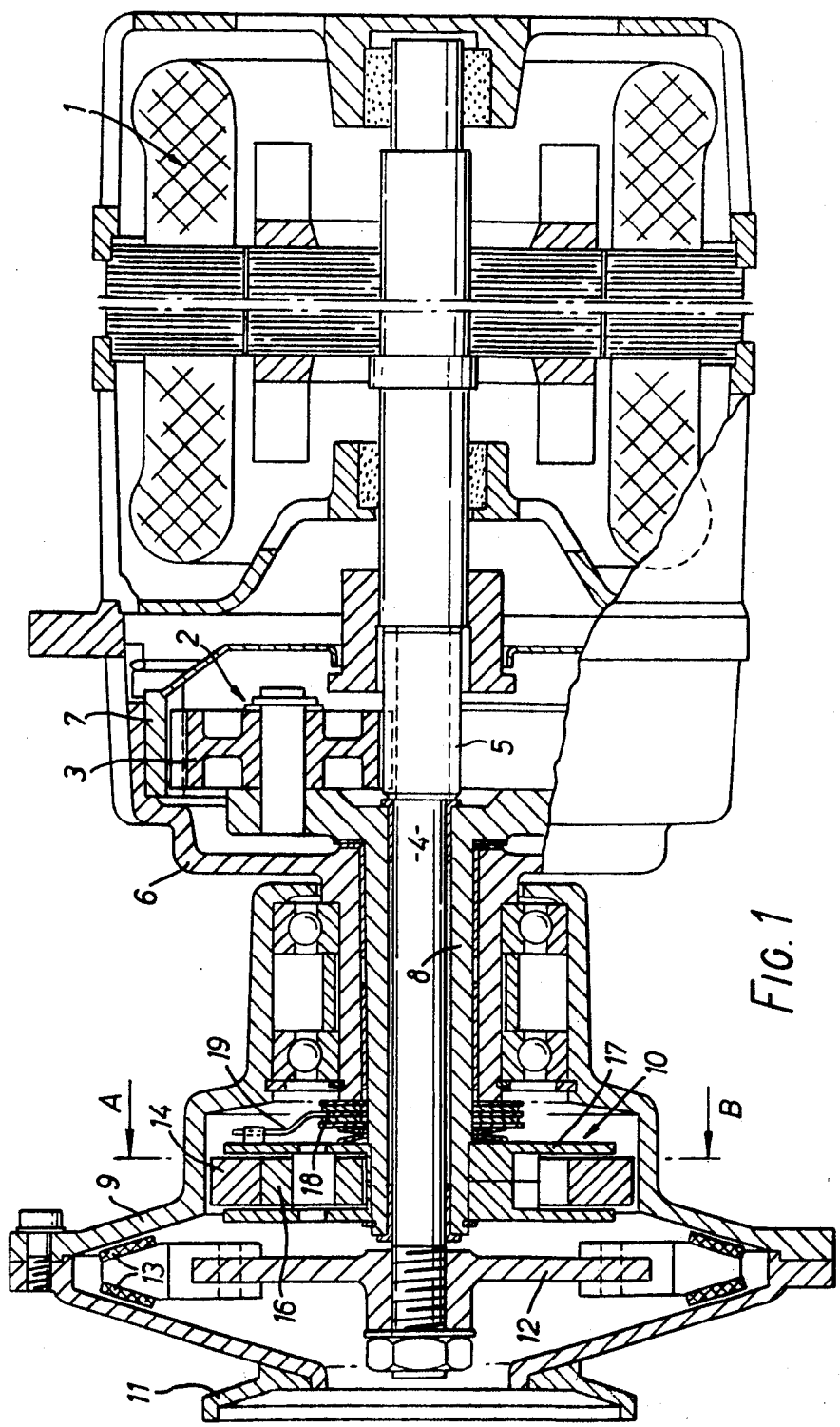
FIG. 1 is a longitudinal section through one embodiment of a drive unit according to the invention.

The drive unit for drum-type automatic washing machines represented in FIG. 1 has a pole-changeable electric motor 1 which is a single-phase induction motor delivering two speeds, for example 1,400 and 2,800 rpm. Preceding this is a coaxially mounted reduction gear 2, the planet wheels 3 of which engage on the one hand in the sun wheel 5 mounted on a motor shaft 4 and on the other hand in a toothed rim 7 secured in a gear casing 6. The washing speed delivered by the reduction gear 2, for example with four-pole operation of the electric motor 1, is taken off by a hollow shaft 8 surrounding the motor shaft 4 and serving as a satellite carrier at the same time, and is transmitted, through a friction clutch 10 acting at the inner face of a clutch housing 9, to a belt pulley 11 which represents the drive member and which is connected to the clutch casing 9 for joint rotation. In order to transmit the higher speed produced by the electric motor 1 for spin-drying, to a belt pulley 11, a centrifugal clutch 12 is secured to the free end of the motor shaft 4. As a result of the appropriately selected design, only in the case of the higher motor speed are its radially pivotable spring-loaded clutch jaws 13 connected to the clutch casing 9 which is mounted in ball bearings on the hollow shaft 8 and which then sets the slower running friction clutch 10 out of action by overtaking it. When the electric motor 1 is only delivering the lower washing speed, the clutch jaws 13 do not come into engagement.

Figure 2:
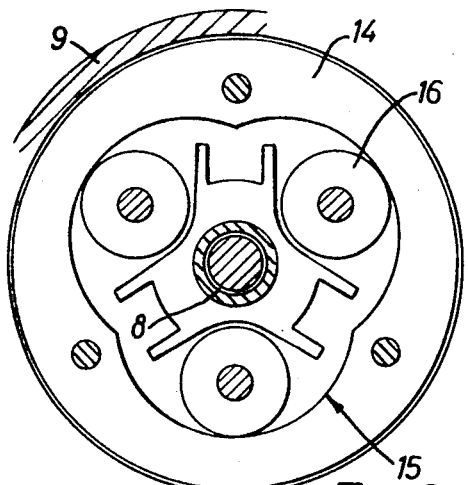
FIG. 2 is a cross-section through the friction clutch along the line A–B in FIG. 1.
Figure 3:
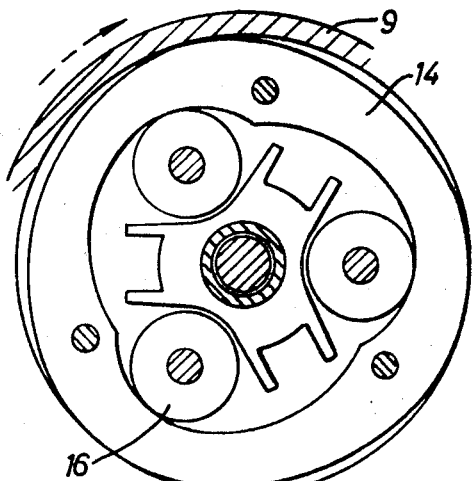
FIG. 3 is a cross-section similar to FIG. 2 but showing the friction clutch in the engaged state.
Figure 6:
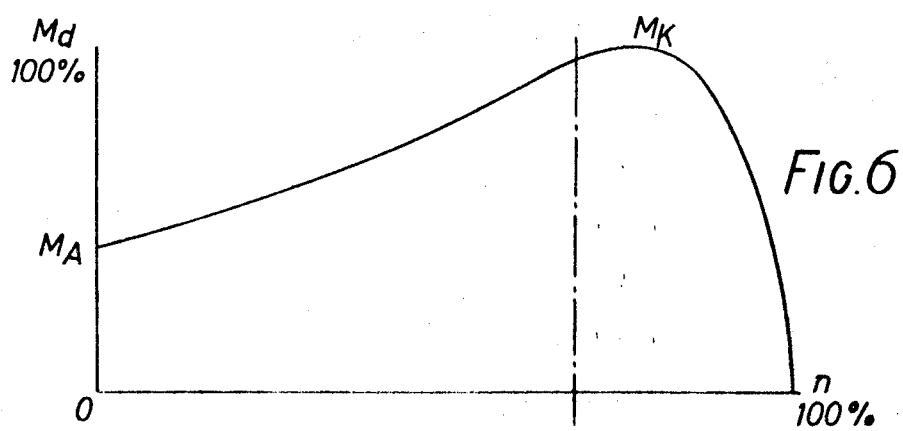
FIG. 6 shows the characteristic curve of the electric motor during the washing operation.

According to the essential feature of the invention the friction clutch 10 has a flexible clutch ring 14 which is made of elastic material and which receives, in its interior, pressure rollers 16 which are provided in a recess 15 in the form of a heart cam, as can be seen from FIG. 2. The pressure rollers 16 are mounted on lateral flanges 17 rigidly connected to the hollow shaft 8 and, when the electric motor 1 is in operation, press the clutch ring 14, which is held back by a fixed-point lever 19 braked between friction discs 18 on the gear casing 6, against the clutch casing 9 by deformation. This operation which always takes place on a change in the washing direction of rotation after a single revolution of the friction clutch 10, is shown in FIG. 3. Its favorable action is expressed in that the engagement no longer takes place immediately after the starting of the electric motor but only after several revolutions and so the pull-out torque of the electric motor 1, which is considerably above the starting torque, is available for the drive of the automatic washing machine. The corresponding motor characteristic curve is reproduced in FIG. 6.

The flexible clutch ring 14 avoids the shock loading which occurs with conventional drive units as well as the louder clutch noises which occur in this connection.

Figure 4:
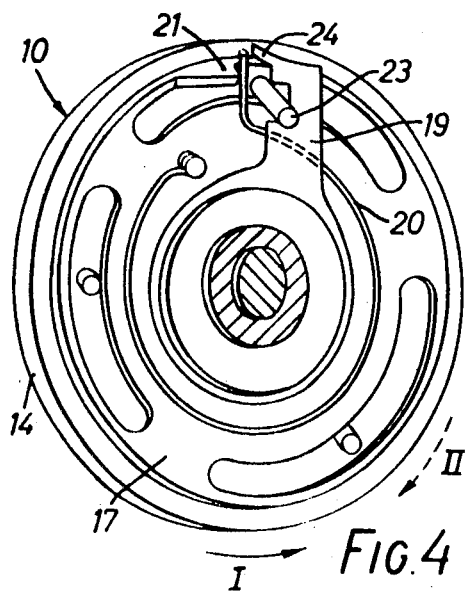
FIG. 4 is a perspective view of the friction clutch in the position which it assumes before the beginning of a washing operation taking place counter to the spin-drying direction of rotation.
Figure 5:
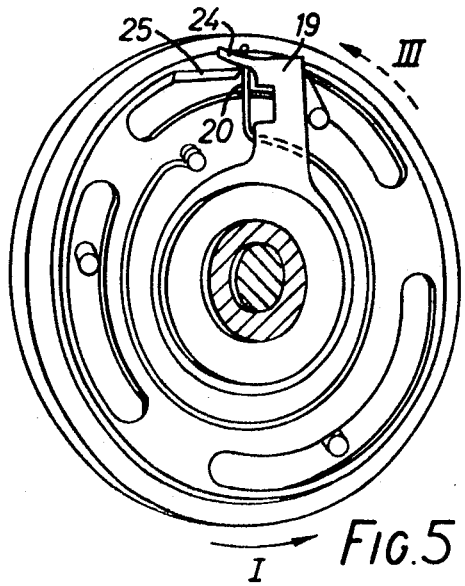
FIG. 5 is a perspective view of the friction clutch in the position which it assumes during washing operations which take place in the spin-drying direction of rotation.

FIGS. 4 and 5 show further structural characteristics of the friction clutch 10 whereby faulty engagement is eliminated. According to these, the friction clutch 10 is equipped with a resilient pawl 20 which is articulated for axial movement on the flange 17 and to this extent on the hollow shaft 8, and which, in the direction of rotation I occurring during the spin-drying, bears against a stop 21 provided on the flange 17. Thus it prevents a pin 23 associated with the clutch ring 14 and projecting through a slot guide 22 in the flange 17, from moving beyond its zero position in the spin-drying direction of rotation I, so that a locking clutch action between the clutch ring 14 and the clutch casing 9 cannot occur in any circumstances during the spin drying.

In order that the pawl 20 may not hamper the engagement of the friction clutch 10 in the washing direction of rotation II, which is opposite to the spin-drying direction of rotation I, it must be lifted over the stop 21. On the other hand, in the washing direction III corresponding to the spin-drying direction I it may be in the stop position because it does not then disturb the movement of the pin 23. In order to obtain this alternate engagement and disengagement the fixed-point lever 19 is provided with a projection 24 which engages above or below the pawl 20 depending on the direction of rotation of the friction clutch 10. This projection 24 lifts the pawl 20 in the washing direction II counter to the spin-drying direction I in order to release the clutch ring 14, which takes place shortly after the position shown in FIG. 4 is reached. In the washing direction III corresponding to the spin-drying direction I, the projection 24 pulls the pawl 20 back over the stop 21, which is constructed in the form of inclined plane 25 at one side for this purpose, as shown in FIG. 5, so that the freedom of movement of the clutch ring 14 in the spin-drying direction I is again cancelled.

It will be understood that the above description of the present invention is susceptible to various modifications changes and adaptations.

What is claimed is:

1. A drive unit for a drum-type automatic washing machined requiring a low speed of rotation for washing and rinsing and higher speeds for spin-drying, said drive unit comprising a drive motor in the form of a pole-changeable electric motor producing at least two speeds of rotation, a motor shaft, a hollow shaft mounted on said motor shaft, a reduction gear arranged to transmit drive from the motor shaft to the hollow shaft, a friction clutch mounted on said hollow shaft, a clutch casing arranged to be acted on by said friction clutch, a centrifugal clutch mounted on said motor shaft and a drive member secured to said clutch casing, said friction clutch being operative at low speeds of said drive motor to cause rotation of said drive member and said centrifugal clutch being operative only at high speeds of said drive motor to cause rotation of said drive member, and said friction clutch comprising a flexible clutch ring having a recess in the form of a heart cam, lateral flanges mounted on said hollow shaft, pressure rollers mounted on said lateral flanges and located in said recess, a number of friction discs and a lever mounted between said friction discs and engageable with at least one of said lateral flanges, said pressure rollers being effective to deform said flexible clutch ring to engage said clutch casing after a single revolution of said lateral flanges.

2. A drive unit as claimed in claim 1, in which said clutch ring is made of elastic material.

3. A drive unit as claimed in claim 1, in which the friction clutch is further provided with a resilient pawl which is articulated on said one lateral flange and which is axially movable on said hollow shaft, a stop member on said lateral flange and a pin on said clutch ring, said pawl bearing against said stop in one direction of rotation of the motor shaft and preventing rotation of the clutch ring beyond a position in which said pin engages said pawl and said lever having a projection which, in the opposite direction of rotation of said motor shaft, is arranged to lift said pawl away from said stop to release said clutch ring, said stop taking the form of an inclined plane and the projection on said lever being further arranged to pull said pawl over said stop into the position locking said clutch ring against rotation when said one direction of the motor shaft is resumed.

* * * * *